United States Patent Office 2,962,474
Patented Nov. 29, 1960

2,962,474

PROCESS FOR STABILIZING HALOGENATED BUTYL RUBBER AGAINST GELATION WITH AN ORGANIC SULFUR COMPOUND, AND STABILIZED PRODUCT OBTAINED THEREBY

James V. Fusco, Fanwood, Samuel B. Robison, Roselle, and Alfred L. Miller, Cranford, N.J., assignors to Esso Research and Engineering Company, a corporation of Delaware No Drawing. Filed Mar. 5, 1957, Ser. No. 643,944

4 Claims. (Cl. 260—45.8)

This invention relates to the stabilization of rubbery polymeric compositions containing partially halogenated copolymers of isoolefins and multiolefins, particularly chlorinated and/or brominated butyl rubber with minor proportions of certain organic sulfur-bearing compounds.

Copolymers of the general type hereinbefore mentioned, which are desirably chlorinated or brominated and stabilized with organic sulfur-bearing compounds in accordance with the present invention, especially where the copolymer comprises a major proportion (preferably about 85 to 99.5%) of a $C_4$ to $C_8$ isoolefin such as isobutylene, 2-methyl-butene-1 or 3-methyl-butene-1, etc., with a minor proportion (preferably about 15 to 0.5 weight percent) of a multiolefin of about 4 to 14, preferably about 4 to 6 carbon atoms, are commonly referred to in patents and technical literature as "butyl rubber," or GR–I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, dimethallyl, allo-ocymene, vinyl fulvenes, etc. The copolymer comprising isobutylene and isoprene is preferred, although the copolymer may contain about 0.05 to 20.0 parts by weight, preferably about 0.2 to 5.0 parts by weight based on total reacting comonomers of such monoolefinic compounds containing an aromatic nucleaus as styrene, p-methyl styrene, alpha methyl styrene, indene, dihydronaphthalene, dichlorostyrene, p-chlorostyrene, mixtures thereof, etc. Such a copolymer has a Staudinger molecular weight between about 20,000 and 300,000, and a mole percent unsaturation between about 0.5 and 15.0.

In accordance with the present invention, it has now been found that while isoolefin-multiolefin copolymers such as butyl rubber do not respond to stabilization by such organic sulfur-bearing materials as N,N'-thio (especially polythio) bis heterocyclic compounds, the halogenated derivatives of these copolymers are surprisingly improved by such stabilizing compounds as to resistance to gelation as exemplified by good hexane solubility, as to resistance to dehydrohalogenation as exemplified by low corrosion of tinplate, and particularly as to resistance to scorching and thermal deterioration during finishing operations, milling or compounding.

The halogenated rubbery isoolefin-multiolefin-containing copolymers, particularly chlorinated and/or brominated butyl rubbers, which are advantageously stabilized by N,N'-thio bis heterocyclic compounds in accordance with the present invention, are derived from the foregoing isoolefin-multiolefin hydrocarbon copolymers. They are produced by carefully chlorinating or brominating these copolymers in a manner which does not degrade the molecular weight thereof, as more fully described hereinafter. The resulting halogenated copolymers may be vulcanized by sulfur and/or zinc oxide and/or primary or polyfunctional amines with or without added vulcanization accelerators, especially of the thiocarbamate type. The vulcanizates and covulcanizates with other rubbery polymers such as natural and GR–S rubbers have been found to exhibit good stress-strain properties and to have superior heat aging resistance compared to the corresponding unhalogenated copolymers. Since these halogenated copolymers already possess heat aging resistances superior to the unhalogenated copolymers, and the unhalogenated copolymers are not improved as to heat aging resistance by the addition thereto of derivatives of N,N'-thio bis heterocyclic compounds hereinafter more fully described, and in fact tend to be gelled by these compounds, it is most unexpected that such compounds have now been found to even further improve both the heat aging resistance and scorch resistance of the halogenated copolymers.

In order to produce halogenated butyl rubber, the halogenation is regulated so that the resulting butyl rubber will contain about at least 0.5 weight percent (preferably at least about 1.0 weight percent) combined halogen but not more than about "X" weight percent combined chlorine or 3.0 "X" weight percent combined bromine wherein:

$$X = \frac{M_3 L}{(100-L)M_1 + L(M_2+M_3)} \times 100$$

and
L = mole percent of the multiolefin in the polymer
$M_1$ = molecular weight of the isoolefin,
$M_2$ = molecular weight of the multiolefin,
$M_3$ = atomic weight of chlorine or bromine Suitable halogenating agents which may be employed are gaseous chlorine, liquid bromine, alkali metal hypochlorites or hypobromites, $C_4$ to $C_{10}$ tertiary alkyl hypochlorites, sulfur bromides, sulfuryl chloride, pyridinium chloride perchloride, N-bromosuccinimide, alpha-chloroaceto-acetanilide, N,N'-dichloro or dibromo 5,5-dimethylhydantoin, iodine halides, trichlorophenol chloride, N-chloroacetamide, beta-bromo-methyl phthalimide, etc. The preferred halogenating agents are gaseous chlorine, liquid bromine, sulfuryl chloride, sulfuryl bromide, chlorohydantoins, bromohydantoins, iodine monochloride, and related materials.

The halogenation is generally conducted at temperatures above 0° to about 100° C., depending upon the particular halogenating agent, for about one minute to several hours. An advantageous pressure range is from about 0.1 to 1000 p.s.i.a., atmospheric pressure being satisfactory. The halogenation may be accomplished by preparing a 1 to 80 weight percent solution of such copolymers as above, in a substantially inert liquid organic solvent such as a $C_3$ to $C_8$ substantially inert hydrocarbon or halogenated derivatives of saturated hydrocarbons; e.g., hexane, mineral spirits, cyclohexane, benzene, chlorobenzene, chloroform, carbon tetrachloride, mixtures thereof, etc., and adding thereto the halogenating agent, which may optionally be in solution, such as dissolved in a substantially inert hydrocarbon, an alkyl chloride, carbon tetrachloride, carbon disulfide, etc. If chlorine gas is employed, it may also be diluted with up to about 50 times its volume, preferably about 0.1 to 5.0 times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried under about 1 to 760 millimeters or higher of mercury pressure absolute at about 0° to 180° C., preferably at about 50° to 150° C. (e.g. 70° C.). Other methods of recovering the halogenated copolymer are by conventional spray or drum drying techniques. Alternatively, the solution of the halogenated butyl rubber may be injected into a vessel containing steam and/or agitated water heated to a temperature sufficient to volatilize the solvent and form an aqueous slurry of the halogenated butyl rubber. The halogenated butyl rubber may then be separated from the slurry by filtration and drying or recovered as a "crumb" or as a dense sheet or slab by conventional hot milling and/or extruding procedures. As so produced, the halogenated rubbery copolymer has a Staudinger molecular weight within the range between approximately 20,000 to 300,000, preferably about 25,000 to 200,000, and a mole percent unsaturation of about 0.5 to 15.0.

In practicing the present invention, the resulting unvulcanized chlorinated isoolefin-multiolefin-containing copolymer, prior to compounding and curing, is blended at a temperature of between about 0° and 200° C., preferably between about 25° and 50° C., with about 0.01 to 10.0, advantageously about 0.05 to 5.0, preferably about 0.1 to 3.0 weight percent of one or more of the N,N'-thio bis heterocyclic compounds enumerated hereinafter. The organic stabilizing compounds employed may have boiling points between about 100° and 700° C. and have the general formula given hereinafter, the members of all of which may be used singly or in combination:

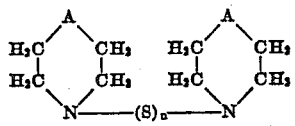

in which A is selected from the group consisting of O, S, and $CH_2$, $n$ being an integer of between about 1 and 6. Typical organic sulfur bearing compounds useful for the purposes of the present invention include N,N'-dithiodimorpholine; N,N'-tetrathiodimorpholine; N,N'-dithiodipiperidine; N,N'-tetrathiodipiperidine; N,N'-dithio-ditetrahydro-paraisothiazine; N,N'-tetrathio-ditetrahydro-paraisothiazine; etc.

In one embodiment of the present invention, substantially all of the organic stabilizing compound required is blended with the unvulcanized halogenated copolymer slurry when the halogenated copolymer is recovered i.e., precipitated and/or injected into a hot aqueous medium) but prior to the drying, milling and/or extruding steps. In another embodiment of the invention, the organic stabilizing compound is added to the halogenated copolymer solution prior to recovering the copolymer by spray drying and/or drum drying and/or precipitation and/or injection into a hot aqueous medium. Alternatively, the organic stabilizing compound or compounds may be added on a cold mill or Banbury prior to vulcanization so as to prevent copolymer degradation during milling and/or compounding. However, it is especially desirable to blend with the halogenated copolymer at least about 0.1 to 1.0 part, per hundred parts of halogenated copolymer, of at least one of the organic stabilizing compounds prior to such recovery or finishing operations as spray drying, drum drying, extruding or calendering since the organic stabilizing compound substantially prevents dehydrohalogenation, cross linking or gelling and degradation or breakdown of the halogenated copolymer during these operations.

The foregoing compositions comprising chlorinated isoolefin-multiolefin-containing copolymers and organic stabilizing compounds may be hot-milled, extruded, calendered or dried with facility, in accordance with conventional practice, without substantial dehydrohalogenation or thermal degradation. One hundred parts by weight of these resulting compositions are then advantageously compounded with about 10 to 150 parts by weight of a filler or fillers such as carbon blacks or clays; about 0.5 to 10.0 parts by weight of sulfur; about 0.5 to 3.0 parts by weight of accelerators such as tellurium diethyl dithiocarbamate, tetramethyl thiuram disulfide, mercaptobenzothiazole or benzothiazyl disulfide; about 2 to 30 parts by weight of zinc oxide and/or primary or polyfunctional amines; about 0.1 to 2.0 parts by weight of a processing aid such as stearic acid, with or without the addition of plasticizers such as hydrocarbon oils, tars, waxes, resins or organic esters; pigments; magnesium oxide and/or calcium oxide; quinone dioxime or its derivatives or homologues; etc. The compounded stock formed may then be vulcanized at temperatures of between about 200° to 450° F., preferably about 250° to 400° F., for times between about a few seconds to several hours (e.g. for about 30 seconds to 2 hours).

The stabilized, halogenated issolefin-multiolefin copolymers (particularly halogenated butyl rubber, stabilized in accordance with the invention) may also be cured by sulfur and/or zinc oxide and/or primary or polyfunctional amines with or without added accelerators in the presence of minor proportions of resinous polymerized hydroxy aromatic (or heterocyclic) dialcohol compounds, particularly about 0.1 to 20, preferably about 0.5 to 10.0 weight percent of dimethylol phenolic resins. The foregoing dialcohol resins are produced by heating the monomeric phenol dialcohol at temperatures of between about 75° and 175° C.; (e.g., 125° C.), care being taken to terminate the reaction while the resin is in the soluble (i.e., in organic solvents) and fusible state. The stabilized halogenated butyl rubber may also be blended with about 0.5 to 10%, of a group II metal silicate, particularly calcium silicate, and/or with about 1 to 5% of an adsorbent deactivator such as various high boiling polar compounds, e.g., ethylene glycol, during or preferably before the rubber is compounded and cured. Vulcanizates or covulcanizates of this last-mentioned type are especially useful in tires (especially in the carcass, undertread and bead areas), in tire casing curing bags or diaphragms, and in steam hose or similar articles. The vulcanization conditions for such compositions are generally as hereinbefore mentioned.

In order to more fully illustrate the present invention, the following experimental data are given:

*Example I*

A commercial butyl rubber was dissolved in benzene. The butyl rubber had a Mooney viscosity (8 minutes at 212° F.) of 75, and a mole percent unsaturation of 1.6. The chlorination of a solution of the uncured butyl rubber was conducted in a 500-gallon glass-lined Pfaudler reactor equipped with an agitator, baffle, submersed stainless steel sparger ring and a conduit leading into the ring.

Gaseous chlorine was continuously added through the conduit via the sparger ring to the butyl rubber solution over a period of ½ hour at a temperature level of 30° C. and under atmospheric pressure. The chlorination was then terminated and the solution containing the chlorinated butyl rubber formed was agitated for an additional 15 minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

| | Pounds added | Percent in the Final Polymer |
|---|---|---|
| Butyl rubber | 170 | 98.70 |
| Benzene solvent | 1,540 | |
| Chlorine | 4.8 (i.e. 2.8%) | 1.30 |

The resulting water-washed solution containing the stabilized, chlorinated rubbery butyl rubber (hereinafter referred to as chlorinated butyl rubber "A") was then recovered by injecting the dissolved, chlorinated polymer into an agitated aqueous solution containing a commercial wetting agent of the aliphatic poly oxyethylene ether type (Sterox A J) in an amount of 0.8 pound per 100 pounds of chlorinated rubber as a dispersing aid; the hot aqueous solution employed containing 4150 pounds of water per 100 pounds of chlorinated butyl rubber. The agitated solution was maintained at a temperature of between about 190° and 210° F. (e.g., 200° F.) whereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e. 82° C.) and dried for 10 hours. The crumb depth on the tray was about ½ inch. The crumb was then completely dried and compacted by milling for 20 minutes on a conventional rubber mill having a roll temperature of 260° F. (i.e. 127° C.).

Four samples, each containing 100 parts by weight of chlorinated butyl rubber "A," were compounded on a cold mill (e.g. 20° C.) with various amounts of N,N'-dithiodimorpholine, 50 parts by weight of MPC carbon black and 0.5 part by weight of stearic acid. After aging for 1 hour in a circulating air oven at 300° F. the samples were compared to a control sample containing no added N,N'-dithiodimorpholine. All samples were compounded after aging with 5.0 parts by weight of zinc oxide, 2.0 parts by weight of sulfur, and 1.0 part by weight of tellurium diethyl dithiocarbamate and vulcanized at 307° F. for 40 minutes. The physical inspections were as follows:

| Sample | Control | A | B | C | D |
|---|---|---|---|---|---|
| N,N'-dithiodimorpholine (p.h.r.) | | 0.25 | 0.50 | 1.0 | 2.0 |
| Tensile strength (p.s.i.) | 1,240 | 2,850 | 2,850 | 2,750 | 3,050 |
| Modulus @ 300% Elong. (p.s.i.) | 1,150 | 1,060 | 1,060 | 1,150 | 1,400 |
| Elongation (percent) | 340 | 530 | 480 | 500 | 500 |

The above data show that chlorinated butyl rubber stabilized with an N,N'-polythio bis heterocyclic compound in accordance with the present invention cures into a vulcanizate having improved tensile strength and elongation compared to a vulcanizate containing no added stabilizing compound.

*Example II*

The same general procedure as in Example I, sample C, was repeated omitting the MPC carbon black throughout. The resulting gum vulcanizate was then compared to a gum vulcanizate containing no added N,N'-dithiodimorpholine. The results were as follows:

| Gum vulcanizate sample | Control | E |
|---|---|---|
| Added N,N'-dithiodimorpholine | No | Yes |
| Tensile strenght (p.s.i.) | 285 | 1,600 |
| Elongation (percent) | 300 | 780 |

The above data show that chlorinated butyl rubber stabilized with N,N'-dithiodimorpholine, in accordance with the present invention, cures into a high quality gum vulcanizate whereas unstabilized chlorinated butyl rubber does not.

*Example III*

A sample of 100 parts by weight of chlorinated butyl rubber "A," which had been blended with 0.5 part by weight of N,N'-dithiodimorpholine on a rubber mill at 20° C. for 15 minutes, was compared to a control sample. Portions of both samples were placeed on tin plate in a circulating air oven at 300° F. for 1 hour and 4 hours duration. At the end of these times, the degree of corrosion of the tinplate was noted and the portions tested for solubility in hexane. The results were as follows:

| | Control | Sample F |
|---|---|---|
| Heat aged 1 hour: | | |
| Added N,N'-dithiodimorpholine | No | Yes. |
| Degree of corrosion of tinplate | Severe | None. |
| Solubility in hexane | Insoluble | Soluble. |
| Heat aged 4 hours: | | |
| Added N,N'-dithiodimorpholine | No | Yes. |
| Degree of corrosion of tinplate | Very severe | None. |
| Solubility in hexane | Insoluble | Soluble. |

The above data show that chlorinated butyl rubber is effectively stabilized as to resistance to dehydrohalogenation (as exemplified by failure to corrode tinplate) by the addition of the stabilizer N,N'-dithiodimorpholine. It is also shown that the same stabilizer substantially prevents gelation of the rubber as exemplified by its complete solubility in hexane (see sample "F").

*Example IV*

The same general procedure as in Example I was repeated omitting the aging step but testing the compounded stocks at 260° F. for their Mooney scorch times to give a five point rise above the minimum. One hundred parts by weight of chlorinated butyl rubber "A" were compounded with 45 parts by weight of SAF carbon black, 5.0 parts by weight of zinc oxide, 1.0 part by weight of tellurium diethyl dithiocarbamate, 0.5 part by weight of stearic acid and 5.0 parts by weight of a hydrocarbon plasticizer oil derived from a napthenic base crude and having a specific gravity of 0.90, a flash point by the open cup method of 445° F., a viscosity in S.S.U. at 100°° F. of 510 and at 210° F. of 55 and an iodine number of 16. The resulting Mooney viscosities were obtained compared to a control, additional compounding data being as follows:

| Sample | Parts by weight | | |
|---|---|---|---|
| | Control | G | H |
| Sulfur | 1.0 | 1.0 | 2.0 |
| N,N'-dithiodimorpholine | | 1.0 | 2.0 |
| Mooney scorch at 260° F. (minutes) | 5.0 | 22 | 24 |

The above data shows that chlorinated butyl rubber stabilized with an N,N'-polythio bis heterocyclic compound in accordance with the present invention has much better scorch resistance (i.e. a longer Mooney scorch time) than chlorinated butyl rubber not thus stabilized.

Resort may be had to variations and modifications of the disclosed embodiments without departing from the spirit of the invention or the scope of the appended claims.

What is claimed is:
1. In a process for preparing a copolymer of 85 to 99.5% of a $C_4$ to $C_8$ isoolefin with 15 to 0.5% of a $C_4$ to $C_{14}$ multiolefin containing at least about 0.5 weight percent of combined halogen in its structure which has been recovered from a water slurry; the improvement which comprises blending said copolymer with 0.01 to 10 weight percent of an organic sulfur compound of the formula

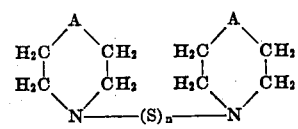

in which A is selected from the group consisting of O, S, and $CH_2$, and $n$ being an integer of between about 1 and 6 at a temperature between 0 and 200° C. prior to recovery from said slurry to provide a copolymer therefrom stabilized against gelation.

2. In a process for preparing a copolymer of 85 to 99.5% isobutylene with 15 to 0.5% isoprene containing at least about 0.5 weight percent of combined chlorine in its structure which has been recovered from a water slurry; the improvement which comprises blending said polymer with 0.01 to 10 weight percent of N,N'-dithiodimorpholine at a temperature between 0 to 200° C. prior to recovery from said slurry to provide a copolymer therefrom stabilized against gelation; said stabilized chlorinated copolymer being capable of being subsequently compounded with 10 to 50 parts by weight of fillers, 0.5 to 10 parts by weight of sulfur, 0.5 to 3.0 parts by weight of accelerators, 2 to 30 parts by weight of zinc oxide, 0.1 to 2.0 parts by weight of stearic acid and cured at a temperature between 200° and 450° F. for about 30 seconds to 2 hours.

3. A composition stabilized against gelation which comprises a halogenated copolymer of 85 to 99.5% of a $C_4$ to $C_8$ isoolefin with 15 to 0.5% of a $C_4$ to $C_{14}$ multiolefin which has been recovered from a water slurry; said copolymer containing at least 0.5 weight percent of combined halogen in its structure; said halogenated copolymer having been blended with 0.01 to 10 weight percent of an organic sulfur compound of the formula

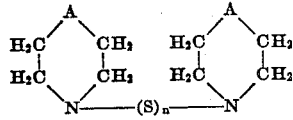

in which A is selected from the group consisting of O, S, and $CH_2$, and $n$ being an integer of between about 1 and 6 at a temperature between 0 and 200° C. prior to recovery from said slurry.

4. A composition stabilized against gelation which comprises a halogenated copolymer of 85 to 99.5% isobutylene with 15 to 0.5% isoprene which has been recovered from a water slurry; said copolymer containing at least 0.5 weight percent of combined halogen in its structure; said halogenated copolymer having been blended with 0.01 to 10 weight percent of N,N'-dithiodimorpholine at a temperature between 0 and 200° C. prior to recovery from said slurry; said stabilized copolymer being capable of being subsequently compounded with 10 to 50 parts by weight of fillers, 0.5 to 10 parts by weight of sulfur, 0.5 to 3.0 parts by weight of accelerators, 2 to 30 parts by weight of zinc oxide, 0.1 to 2.0 parts by weight of stearic acid and being cured at a temperature between 200° and 450° F. for about 30 seconds to 2 hours.

References Cited in the file of this patent
UNITED STATES PATENTS

| | | |
|---|---|---|
| 2,325,735 | Blake | Aug. 3, 1943 |
| 2,490,518 | Hand | Dec. 6, 1949 |
| 2,631,984 | Crawford et al. | Mar. 17, 1953 |
| 2,732,354 | Morrissey et al. | Jan. 24, 1956 |
| 2,747,005 | Zerbe et al. | May 22, 1956 |
| 2,821,516 | Wolf | Jan. 28, 1958 |

OTHER REFERENCES

Throdahl et al.: Ind. & Engr. Chem., volume 43, No. 2, February, 1951, pages 421–429.

Merrified: Rubber World, volume 134, No. 3, June, 1956, pages 415–421.